United States Patent
Evangelisti et al.

(10) Patent No.: US 10,407,519 B2
(45) Date of Patent: Sep. 10, 2019

(54) MAGNESIUM DICHLORIDE-ETHANOL ADDUCTS AND CATALYST COMPONENTS OBTAINED THEREFROM

(71) Applicant: BASELL POLIOLEFINE ITALIA S.R.L., Milan (IT)

(72) Inventors: Daniele Evangelisti, Ferrara (IT); Benedetta Gaddi, Ferrara (IT); Gianni Collina, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/826,362

(22) Filed: Nov. 29, 2017

(65) Prior Publication Data

US 2018/0079837 A1  Mar. 22, 2018

Related U.S. Application Data

(63) Continuation of application No. 14/236,486, filed as application No. PCT/EP2012/065047 on Aug. 1, 2012, now Pat. No. 9,862,781.

(60) Provisional application No. 61/521,166, filed on Aug. 8, 2011.

(30) Foreign Application Priority Data

Aug. 8, 2011  (EP) ..................... 11176788

(51) Int. Cl.
  *C08F 4/649* (2006.01)
  *C08F 10/00* (2006.01)
  *C08F 4/654* (2006.01)
  *C08F 4/651* (2006.01)

(52) U.S. Cl.
  CPC ............ *C08F 4/6494* (2013.01); *C08F 10/00* (2013.01)

(58) Field of Classification Search
  None
  See application file for complete search history.

(56) References Cited

U.S. PATENT DOCUMENTS

| | | |
|---|---|---|
| 4,399,054 A | 8/1983 | Ferraris et al. |
| 5,100,849 A | 3/1992 | Miya et al. |
| 6,407,028 B1 | 6/2002 | Sacchetti et al. |
| 9,598,509 B2 | 3/2017 | Collina et al. |
| 2005/0032633 A1 | 2/2005 | Morini et al. |
| 2006/0025300 A1 | 2/2006 | Diego et al. |
| 2006/0217261 A1 | 9/2006 | Morini et al. |
| 2007/0021295 A1 | 1/2007 | Morini et al. |

FOREIGN PATENT DOCUMENTS

| | | |
|---|---|---|
| CN | 1037609 C | 3/1998 |
| CN | 1771266 A | 5/2006 |
| CN | 103270056 A | 8/2013 |
| GB | 1295743 A | 11/1972 |
| WO | WO-03082930 A2 | 10/2003 |
| WO | WO-2004026920 A1 | 4/2004 |
| WO | WO-2011076669 A2 | 6/2011 |
| WO | WO-2012084735 A1 | 6/2012 |

OTHER PUBLICATIONS

International Search Report and Written Opinion dated Nov. 27, 2012 (Nov. 27, 2012) for Corresponding PCT/EP2012/065047.

*Primary Examiner* — Catherine S Branch

(57) ABSTRACT

Solid adducts comprising $MgCl_2$ and an alcohol ROH in which R is a C1-C20 hydrocarbon group, in which the amount of alcohol ranges from higher than 42% to 60% by weight and the porosity determined with Hg method due to pores up to 1 μm and expressed in $cm^3/g$, is such that the value of its ratio with the amount of alcohol in percentage falls above the straight line defined by the equation $y=-0.0158x+1.03$ in which y is the porosity of the adduct and x is the alcohol percentage by weight.

13 Claims, No Drawings

MAGNESIUM DICHLORIDE-ETHANOL ADDUCTS AND CATALYST COMPONENTS OBTAINED THEREFROM

This application is a continuation application of copending U.S. patent application Ser. No. 14/236,486, filed Jan. 31, 2014, which is the U.S. National Phase of PCT International Application PCT/EP2012/065047, filed Aug. 1, 2012, claiming priority of European Patent Application No. 11176788.5, filed Aug. 8, 2011 and the benefit under 35 U.S.C. 119(e) of U.S. Provisional Application No. 61/521,166, filed Aug. 8, 2011, the contents of which are incorporated herein by reference in their entirety.

FIELD OF THE INVENTION

The present invention relates to magnesium dichloride/ethanol adducts which are characterized by particular chemical and physical properties. The adducts of the present invention are particularly useful as precursors of catalyst components for the polymerization of olefins.

$MgCl_2$.alcohol adducts and their use in the preparation of catalyst components for the polymerization of olefins are well known in the art.

BACKGROUND OF THE INVENTION

Catalyst components for the polymerization of olefins, obtained by reacting $MgCl_2$.nEtOH adducts with halogenated transition metal compounds, are described in U.S. Pat. No. 4,399,054. The adducts are prepared by emulsifying the molten adduct in an immiscible dispersing medium and quenching the emulsion in a cooling fluid to collect the adduct in the form of spherical particles. The number of moles of alcohol per mole of $MgCl_2$ is generally 3. In order to increase the morphological stability and render the catalyst suitable to produce more porous polymer particles, capable in itself to be used in the preparation of sticky polymers, the alcohol content of the adduct is lowered, before reaction with the titanium compound, to values in the range of 2-2.5 moles. As a positive result, the porosity of the catalyst is increased, but as a downside, the catalyst activity becomes too low.

In WO2004/026920 it is proposed to prepare adducts having an increased amount of alcohol and characterized by a particular X-ray diffraction spectrum. These adducts, if converted as such into catalyst component are able to generate catalysts with increased activity. On the other hand, if the adducts are partially dealcoholated before reaction with the Ti compound, provide a catalyst with a higher porosity content. However, the catalysts obtained by these adducts show a unsatisfactory balance activity and stereospecificity in the polymerization of propylene.

The applicant has now found new $MgCl_2$.mEtOH adducts having specific chemical and physical properties. The adducts of the present invention are characterized by enhanced porosity with respect to the adducts of the prior art having the same alcohol content. The adducts of the present invention can be used to prepare catalyst components for the polymerization of olefins by reacting them with transition metal compounds.

SUMMARY OF THE INVENTION

The present invention therefore relates to adducts comprising $MgCl_2$ and an alcohol ROH in which R is a C1-C20 hydrocarbon group, in which the amount of alcohol ranges from higher than 42% to 60% by weight and the porosity determined with Hg method due to pores up to 1 μm and expressed in $cm^3/g$, is such that the value of its ratio with the amount of alcohol in percentage falls above the straight line defined by the equation $y=-0.0158x+1.03$ in which y is the porosity of the adduct and x is the alcohol percentage by weight.

DETAILED DESCRIPTION OF THE INVENTION

Preferably, R is a C1-C6 alkyl group and in particular ethyl. Preferably the adducts of the invention have a percentage of alcohol ranging from 42 to 57% bw, more preferably from 43 to 55% and especially from 45 to 52% bw. The porosity is preferably in the range 0.2 to 0.6 $cm^3/g$. The adducts may contain minor amount of water of generally lower than 5% more preferably lower than 3% by weight.

Preferably the porosity determined with Hg method due to pores up to 1 μm and expressed in $cm^3/g$, is such that the value of its ratio with the amount of ethanol in percentage falls above the straight line defined by the equation $y=-0.0158x+1.06$ in which x and y have the same meaning explained above.

One of the preferred methods for preparing the adducts of the present invention comprises contacting a ROH alcohol in gas-phase, preferably ethanol, to a preformed solid $MgCl_2(ROH)_m$ in which m ranges from 0.1 to 2.5 which has been in turn obtained by physical or chemical dealcoholation of $MgCl_2(ROH)_n$ adducts in which n is higher than 2.5. Preferably, in the adduct $MgCl_2(ROH)m$ R is ethyl and m is lower than 2.1 preferably lower than 1 and more preferably between 0.1 and 0.8.

The dealcoholated adducts and their preparation is described for example in EP395083 and WO98/44009 the relevant part of which is included by reference.

It is also possible to prepare the $MgCl_2(ROH)_m$ porous adduct using spray drying technology. According to this technology a liquid solution of $MgCl_2$ and alcohol is prepared and then sprayed, through the use of the proper devices that are commercially available, in an environment having temperature a nitrogen flow condition such as to cause rapid partial evaporation of the alcohol and solidification of the particles.

As explained, it is possible to obtain the adducts of the invention by contacting the dealcoholaetd adducts of formula $MgCl_2(ROH)_m$ porous with the alcohol being in gas-phase conditions. To this end, one preferred way to operate is to contact the alcohol and the adduct in into a fluidized bed reactor. A nitrogen stream of calibrated feed rate is used to fluidize the solid adduct. Preferably, the fluidizing nitrogen and the reactor are warmed up at operating temperature in the range of 30-80° C. Although the alcohol can be fed via a dedicated line, it has been found viable to feed it through the same line feeding nitrogen for fluidization. In particular, the alcohol can be fed, at a steady feed rate, in liquid form into a jacketed line, where evaporation takes place, which is dripping inside the fluidizing nitrogen stream. The nitrogen is thus enriched in ethanol vapors prior to contact with the adduct. The jacketed feeding line may conveniently be operated at the substantially same temperature of the fluidized bed reactor, so as to prevent ethanol condensation and to allow uniform ethanol concentration throughout the reactor. It has been found suitable to reach the final desired amount of alcohol by feeding it continuously in a relatively long time, generally ranging from 1 to 100 hours preferably in about 30 to 50 hrs under fluidizing conditions.

The method of the present invention provides solid adducts having a substantially spherical morphology which are particularly suitable in the preparation of spherical catalyst components for the polymerization of olefins and in particular for the gas-phase polymerization process. With the term substantially spherical morphology are meant those particles having a ratio between the greater and smaller axis equal to or lower than 1.5 and preferably lower than 1.3.

Upon reaction with transition metal compounds, the adducts of the invention form suitable catalyst components for the polymerization of olefins.

The adducts can be reacted as such with the transition metal compound or, in alternative, they can be subject to a preliminary step of dealcoholation.

Among transition metal compounds particularly preferred are titanium compounds of formula $Ti(OR)_nX_{y-n}$ in which n is comprised between 0 and y; y is the valence of titanium; X is halogen and R is an hydrocarbon radical, preferably alkyl, radical having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$. Preferably, the reaction is carried out by suspending the adduct in cold $TiCl_4$ (generally 0° C.); then the so obtained mixture is heated up to 80-130° C. and kept at this temperature for 0.5-2 hours. After that the excess of $TiCl_4$ is removed and the solid component is recovered. The treatment with $TiCl_4$ can be carried out one or more times.

The reaction between transition metal compound and the adduct can also be carried out in the presence of an electron donor compound (internal donor) in particular when the preparation of a stereospecific catalyst for the polymerization of olefins is to be prepared. Said electron donor compound can be selected from esters, ethers, amines, silanes and ketones or mixtures thereof. In particular, the alkyl and aryl esters of mono or polycarboxylic acids such as for example esters of benzoic, phthalic, malonic and succinic acid are preferred. Specific examples of such esters are n-butylphthalate, di-isobutylphthalate, di-n-octylphthalate, diethyl 2,2-diisopropylsuccinate, diethyl 2,2-dicyclohexylsuccinate, ethyl-benzoate and p-ethoxy ethyl-benzoate. Also the esters of diols disclosed in U.S. Pat. No. 7,388,061. Among this class, particularly preferred are the 2,4-pentanediol dibenzoate derivatives. Moreover, can be advantageously used also the 1,3 diethers of the formula:

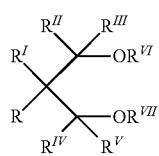

(I)

wherein R, $R^I$, $R^{II}$, $R^{III}$, $R^{IV}$ and $R^V$ equal or different to each other, are hydrogen or hydrocarbon radicals having from 1 to 18 carbon atoms, and $R^{VI}$ and $R^{VII}$, equal or different from each other, have the same meaning of R—$R^V$ except that they cannot be hydrogen; one or more of the R—$R^{VII}$ groups can be linked to form a cycle. The 1,3-diethers in which $R^{VI}$ and $R^{VII}$ are selected from $C_1$-$C_4$ alkyl radicals are particularly preferred.

The electron donor compound is generally present in molar ratio with respect to the magnesium comprised between 1:4 and 1:60.

Preferably, the particles of the solid catalyst components have substantially the same size and morphology as the adducts of the invention generally comprised between 5 and 150 μm.

It has been noted that this preferred way of preparing the catalyst component leads to dissolution of the carboxylic acid metal salt in the liquid reagents and solvents and therefore it is no longer present in the final solid catalyst component.

Before the reaction with the transition metal compound, the adducts of the present invention can also be subjected to a dealcoholation treatment aimed at lowering the alcohol content and increasing the porosity of the adduct itself. The dealcoholation can be carried out according to known methodologies such as those described in EP-A-395083. Depending on the extent of the dealcoholation treatment, partially dealcoholated adducts can be obtained having an alcohol content generally ranging from 0.1 to 2.6 moles of alcohol per mole of $MgCl_2$. After the dealcoholation treatment the adducts are reacted with the transition metal compound, according to the techniques described above, in order to obtain the solid catalyst components.

The solid catalyst components according to the present invention show a surface area (by B.E.T. method) generally between 10 and 500 m²/g and preferably between 20 and 350 m²/g, and a total porosity (by B.E.T. method) higher than 0.15 cm³/g preferably between 0.2 and 0.6 cm³/g.

The amount of the titanium compound in the final catalyst component ranges from 0.1 to 10% wt, preferably from 0.5 to 5% wt.

The catalyst components of the invention form catalysts for the polymerization of alpha-olefins $CH_2$=CHR, wherein R is hydrogen or a hydrocarbon radical having 1-12 carbon atoms, by reaction with Al-alkyl compounds. The alkyl-Al compound can be of the formula $AlR_{3-z}X_z$ above, in which R is a C1-C15 hydrocarbon alkyl radical, X is halogen preferably chlorine and z is a number 0≤z<3. The Al-alkyl compound is preferably chosen among the trialkyl aluminum compounds such as for example trimethylaluminum, triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

The Al/Ti ratio is higher than 1 and is generally comprised between 50 and 2000.

It is possible to use in the polymerization system an electron donor compound (external donor) which can be the same or different from the compound that can be used as internal donor disclosed above. In case the internal donor is an ester of a polycarboxylic acid, in particular a phthalate, the external donor is preferably selected from the silane compounds containing at least a Si—OR link, having the formula $R_a^1R_b^2Si(OR^3)_c$, where a and b are integer from 0 to 2, c is an integer from 1 to 3 and the sum (a+b+c) is 4; R', $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysane, methyl-t-butyldimethoxysilane, dicyclopentyldimethoxysilane, diisopropyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

Also the cyclic ethers such as tetrahydrofurane, and the 1,3 diethers having the previously described formula can be used as external donor.

As previously indicated the components of the invention and catalysts obtained therefrom find applications in the processes for the (co)polymerization of olefins of formula $CH_2=CHR$ in which R is hydrogen or a hydrocarbon radical having 1-12 carbon atoms.

The catalysts of the invention can be used in any of the olefin polymerization processes known in the art. They can be used for example in slurry polymerization using as diluent an inert hydrocarbon solvent or bulk polymerization using the liquid monomer (for example propylene) as a reaction medium. Moreover, they can also be used in the polymerization process carried out in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.1 and 10 MPa, preferably between 1 and 5 MPa. In the bulk polymerization the operating pressure is generally between 1 and 6 MPa preferably between 1.5 and 4 MPa.

The catalysts of the invention are very useful for preparing a broad range of polyolefin products. Specific examples of the olefinic polymers which can be prepared are: high density ethylene polymers (HDPE, having a density higher than 0.940 g/cc), comprising ethylene homopolymers and copolymers of ethylene with alpha-olefins having 3-12 carbon atoms; linear low density polyethylenes (LLDPE, having a density lower than 0.940 g/cc) and very low density and ultra low density (VLDPE and ULDPE, having a density lower than 0.920 g/cc, to 0.880 g/cc) consisting of copolymers of ethylene with one or more alpha-olefins having from 3 to 12 carbon atoms, having a mole content of units derived from the ethylene higher than 80%; isotactic polypropylenes and crystalline copolymers of propylene and ethylene and/or other alpha-olefins having a content of units derived from propylene higher than 85% by weight; copolymers of propylene and 1-butene having a content of units derived from 1-butene comprised between 1 and 40% by weight; heterophasic copolymers comprising a crystalline polypropylene matrix and an amorphous phase comprising copolymers of propylene with ethylene and or other alpha-olefins.

In particular, it has been noticed that the catalyst components obtained from the said adducts generate during polymerization polymer particles of smaller diameter which makes slurry process easier to be controlled.

The following examples are given to further illustrate without limiting in any way the invention itself.

EXAMPLES

Characterization

Porosity and Surface Area with Mercury:

The measure is carried out using a "Porosimeter 2000 series" by Carlo Erba.

The porosity is determined by absorption of mercury under pressure. For this determination use is made of a calibrated dilatometer (diameter 3 mm) $CD_3$ (Carlo Erba) connected to a reservoir of mercury and to a high-vacuum pump ($1·10^{-2}$ mbar). A weighed amount of sample is placed in the dilatometer. The apparatus is then placed under high vacuum (<0.1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm². Under the effect of the pressure, the mercury enters the pores and the level goes down according to the porosity of the material.

The porosity (cm³/g), due to pores up to 1 μm for catalysts (10 μm for polymers), the pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.

EXAMPLES

General Procedure for the Preparation of the Catalyst Component

Into a 1 l steel reactor provided with stirrer, 800 cm³ of $TiCl_4$ at 0° C. were introduced; at room temperature and whilst stirring 24 g of the adduct were introduced together with an amount of diisobutylphthalate as internal donor so as to give a donor/Mg molar ratio of 8. The whole was heated to 100° C. over 90 minutes and these conditions were maintained over 60 minutes. The stirring was stopped and after 30 minutes the liquid phase was separated from the sedimented solid maintaining the temperature at 100° C. A further treatment of the solid was carried out adding 750 cm³ of $TiCl_4$ and heating the mixture at 110° C. over 10 min. and maintaining said conditions for 30 min under stirring conditions (500 rpm). The stirring was then discontinued and after 30 minutes the liquid phase was separated from the sedimented solid maintaining the temperature at 110° C. A further treatment of the solid was carried out adding 750 cm³ of $TiCl_4$ and heating the mixture at 120° C. over 10 min. and maintaining said conditions for 30 min under stirring conditions (500 rpm). The stirring was then discontinued and after 30 minutes the liquid phase was separated from the sedimented solid maintaining the temperature at 120° C. A further treatment of the solid was carried out adding 750 cm³ of $TiCl_4$ and heating the mixture at 120° C. over 10 min. and maintaining said conditions for 30 min under stirring conditions (500 rpm). The stirring was then discontinued and after 30 minutes the liquid phase was separated from the sedimented solid maintaining the temperature at 120° C. Thereafter, 3 washings with 500 cm³ of anhydrous hexane at 60° C. and 3 washings with 500 cm³ of anhydrous hexane at room temperature were carried out. The solid catalyst component obtained was then dried under vacuum in nitrogen environment at a temperature ranging from 40–45° C.

Fraction Soluble in Xylene. (XS)

The solubility in xylene at 25° C. was determined according to the following method: About 2.5 g of polymer and 250 ml of o-xylene were placed in a round-bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight.

The content of said xylene-soluble fraction is expressed as a percentage of the original 2.5 grams. The xylene insoluble fraction is given by the expression 100-XS.

General Procedure for the Polymerization Test

A 4 liter steel autoclave equipped with a stirrer, pressure gauge, thermometer, catalyst feeding system, monomer feeding lines and thermostatting jacket, was used. The reactor was charged with 0.01 gr. of solid catalyst component 0.76 g of TEAL, 0.076 g of cyclohexylmethyldimetoxy silane, 3.2 l of propylene, and 2.0 l of hydrogen. The system was heated to 70° C. over 10 min. under stirring, and maintained under these conditions for 120 min. At the end of the polymerization, the polymer was recovered by removing any unreacted monomers and was dried under vacuum.

General Procedure for the Preparation of Partially Dealcoholated Adducts

An initial amount of microspheroidal $MgCl_2.2.8C_2H_5OH$ was prepared according to the method described in ex. 2 of U.S. Pat. No. 4,399,054 but operating at 3,000 rpm instead of 10,000. Each of the specific partially dealcoholated adduct used in the preparation of the final adduct was prepared by subjecting to thermal dealcoholation an aliquot of the initial microspheroidal $MgCl_2.2.8C_2H_5OH$ adduct. The thermal dealcoholation was carried out at increasing temperatures from 30 to 130° C. and operating in nitrogen current until the desired content of alcohol was obtained.

Example 1

Into a 65 mm diameter fluidized bed 300 g of an adduct having a chemical composition of 24% EtOH and 1.4% $H_2O$ obtained according to the general procedure were fluidized using 200 l/h nitrogen stream then heated up to 65° C. for 6 hrs and then to 80° C. for 12 hrs, while feeding 215 g (274 ml) of ethanol, fed at a feeding rate of about 15 ml/hr for 18 hrs overall. After cooling, 475 g of spherical support were downloaded having a chemical composition of 53.6% EtOH and 1% $H_2O$. Its porosity was 0.298 $cm^3/g$. The so obtained adduct was then used in the preparation of the solid catalyst component according to the general procedure which in turn was used in the polymerization of propylene according to the general procedure. Characterization of catalysts and polymerization results are reported in Table 1.

Example 2

Into a 150 mm diameter fluidized bed 3413 g of an adduct having a chemical composition as that of example 1 were fluidized using 1100 l/h nitrogen stream then heated up to 40° C. for 30 hrs, while feeding 2206 g (2810 ml) of ethanol, fed at a feeding rate of about 93.7 ml/hr for 30 hrs overall. After cooling, 4588 g of spherical support were downloaded having a chemical composition of 50.6% EtOH and 1.2% $H_2O$. Its porosity was 0.319 $cm^3/g$. The so obtained adduct was then used in the preparation of the solid catalyst component according to the general procedure which in turn was used in the polymerization of propylene according to the general procedure. Characterization of catalysts and polymerization results are reported in Table 1.

Comparative Example 1

The procedure of example 1 was repeated with the difference that in the preparation of the catalyst was used a partially dealcoholated adduct prepared according to the general procedure having a content of 55% of EtOH and $H_2O$ 1.1% which was not subject to a re-alcoholation treatment. Its porosity was 0.111 $cm^3/g$. The so obtained adduct was then used in the preparation of the solid catalyst component according to the general procedure which in turn was used in the polymerization of propylene according to the general procedure. Characterization of catalysts and polymerization results are reported in table 1.

Comparative Example 2

The procedure of example 1 was repeated with the difference that in the preparation of the catalyst was used a partially dealcoholated adduct prepared according to the general procedure having a content of 50% of EtOH and $H_2O$ 1.3% which was not subject to a re-alcoholation treatment. Its porosity was 0.19 $cm^3/g$. The so obtained adduct was then used in the preparation of the solid catalyst component according to the general procedure which in turn was used in the polymerization of propylene according to the general procedure. Characterization of catalysts and polymerization results are reported in table 1.

TABLE 1

| Example | Catalyst Compostion | | | Polymerization | | |
| --- | --- | --- | --- | --- | --- | --- |
|  | Mg % | Ti % | DIBP % | Activity Kg/g | XI | Porosity $cm^3/g$ |
| 1 | 19.4 | 2.6 | 9.4 | 68.8 | 97.7 | 0.161 |
| 2 | 19.9 | 2.5 | 8.3 | 68.3 | 97.7 | 0.199 |
| Comp. 1 | 19.9 | 2.6 | 8.4 | 66.3 | 97.1 | 0.087 |
| Comp. 2 | 19.2 | 2.9 | 8.4 | 62.1 | 97.5 | 0.133 |

What is claimed is:

1. A solid catalyst component comprising a solid adduct comprising:

$MgCl_2$ and an alcohol, ROH, wherein R is a C1-C20 hydrocarbon group, wherein the amount of alcohol present in the solid adduct ranges from 42% to 60% by weight and wherein the solid adduct has a porosity determined with Hg method due to pores up to 1 μm and expressed in $cm^3/g$, is such that the value of its ratio with the amount of alcohol in percentage falls above the straight line defined by the equation y=−0.0158x+1.03 in which y is the porosity of the adduct and x is the alcohol percentage by weight.

2. The solid catalyst component of claim 1, wherein the percentage of alcohol ranges from 42 to 57% by weight.

3. The solid catalyst component of claim 2, wherein the percentage of alcohol ranges from 43 to 55% by weight.

4. The solid catalyst component of claim 1, wherein the porosity ranges from 0.2 to 0.6 $cm^3/g$.

5. The solid catalyst component of claim 1, wherein the porosity is such that the value of its ratio with the amount of ethanol in percentage falls above the straight line defined by the equation y=−0.0158x+1.06 in which y is the porosity of the adduct and x is the alcohol percentage by weight.

6. The solid catalyst component of claim 1, wherein R is ethyl.

7. A process comprising contacting an ROH alcohol in gas phase with a solid $MgCl_2(ROH)_m$ adduct in which m ranges from 0.1 to 2.5 which has been in turn obtained by physical or chemical dealcoholation of $MgCl_2(ROH)_n$ adducts in which n is higher than 2.5 to produce a solid adduct, wherein the solid adduct comprises $MgCl_2$ and the alcohol, ROH, wherein R is a C1-C20 hydrocarbon group, wherein the amount of alcohol present in the solid adduct ranges from 42% to 60% by weight and wherein the solid adduct has a porosity determined with Hg method due to pores up to 1 μm and expressed in cm$^3$/g, is such that the value of its ratio with the amount of alcohol in percentage falls above the straight line defined by the equation y=−0.0158x+1.03 in which y is the porosity of the adduct and x is the alcohol percentage by weight.

8. The process according to claim 7, wherein R is ethyl and m is lower than 2.1.

9. The solid catalyst component of claim 1, wherein the solid catalyst component is obtained by reacting the solid adduct with a transition metal compound of one of the groups IV to VI of the Periodic Table of Elements.

10. The solid catalyst component of claim 9, wherein the transition metal compound is selected from titanium compounds having at least one Ti-halogen bond.

11. The solid catalyst component of claim 9, wherein the reaction between transition metal compound and the adduct is carried out in the presence of an electron donor compound selected from esters, ethers, amines, silanes and ketones or mixtures thereof.

12. The solid catalyst component of claim 9, wherein the catalyst component is obtained by reacting the catalyst component of claim 9 with Al-alkyl compounds optionally in the presence of an external electron donor compound.

13. A process for the polymerization of olefins carried out in the presence of the catalyst of claim 12.

* * * * *